United States Patent [19]
Onitsuka et al.

[11] Patent Number: 5,439,868
[45] Date of Patent: Aug. 8, 1995

[54] ABSORBENTS FOR REMOVING LOW-CONCENTRATION NITROGEN OXIDES

[75] Inventors: Shigenori Onitsuka, Ikoma; Masayoshi Ichiki, Osaka; Chikashi Inazumi, Kyoto; Takanobu Watanabe, Kyoto; Atsushi Fukuju, Ibaraki; Masaki Akiyama, Osaka; Yuki Sairyo, Suita; Hidetsugu Kobayashi, Osaka, all of Japan

[73] Assignees: Hitachi Zosen Corporation, Osaka; The Pollution-Related Health Damage Compensation and Prevention Association, Tokyo, both of Japan

[21] Appl. No.: 288,763

[22] Filed: Aug. 11, 1994

Related U.S. Application Data

[63] Continuation of Ser. No. 968,531, Oct. 29, 1992, abandoned.

[30] Foreign Application Priority Data

| Oct. 31, 1991 | [JP] | Japan | 3-286276 |
| Oct. 31, 1991 | [JP] | Japan | 3-286277 |
| Jan. 23, 1992 | [JP] | Japan | 4-010312 |

[51] Int. Cl.$^6$ .......... B01J 20/04; B01J 20/08; B01J 20/28; C09K 3/00
[52] U.S. Cl. .......... 502/415; 96/154; 252/189; 252/190; 252/192; 423/239.1; 502/527
[58] Field of Search .......... 252/184, 189, 190, 192; 502/230, 405, 415, 527; 96/154; 423/239.1

[56] References Cited

U.S. PATENT DOCUMENTS

| 3,799,796 | 3/1974 | Hunter | 502/527 X |
| 3,835,069 | 9/1974 | Gandhi et al. | 502/302 |
| 3,880,775 | 4/1975 | Gandhi et al. | 502/302 |
| 3,972,837 | 8/1976 | Acres et al. | 502/527 X |
| 4,164,546 | 8/1979 | Welty, Jr. | 423/239 |
| 4,201,751 | 5/1980 | Hölter et al. | 502/405 |
| 4,207,209 | 6/1980 | Matsuda et al. | 502/304 |
| 4,323,544 | 4/1982 | Magder | 423/239 |
| 4,416,800 | 11/1983 | Abe et al. | 502/527 X |
| 4,426,365 | 1/1984 | Magder | 423/239 |
| 4,755,499 | 7/1988 | Neal et al. | 502/415 |
| 4,847,234 | 7/1989 | Hums | 502/527 X |
| 5,078,979 | 1/1992 | Dunne | 423/212 |

FOREIGN PATENT DOCUMENTS

| 2189112 | 1/1974 | France . | |
| 2211286 | 7/1974 | France . | |
| 2846476 | 5/1979 | Germany . | |
| 0070839 | 6/1981 | Japan | 502/527 |
| 58-144332 | 8/1983 | Japan | 502/230 |

OTHER PUBLICATIONS

European Search Report dated Jun. 21, 1993.
European Search Report dated Mar. 3, 1993.

*Primary Examiner*—Richard D. Lovering
*Attorney, Agent, or Firm*—Armstrong, Westerman Hattori, McLeland & Naughton

[57] ABSTRACT

The invention provides first to fourth adsorbents for removing low-concentration nitrogen oxides. The first adsorbent comprises a carrier of gamma-alumina, and ruthenium supported thereon. The second adsorbent comprises a carrier of anatase-type titania, and ruthenium supported thereon. The third adsorbent comprises ceramic paper retaining a carrier of anatase-type titania thereon, and ruthenium supported on the ceramic paper. The fourth adsorbent comprises ceramic paper retaining a carrier of anatase-type titania thereon, and a ruthenium halide and a halide of addition metal which are co-supported on the ceramic paper. These adsorbents are free of the influence of moisture and therefore usable without necessitating energy-consuming dehumidification or only with dehumidification on a reduced scale.

14 Claims, 12 Drawing Sheets

ABSORBENTS FOR REMOVING LOW-CONCENTRATION NITROGEN OXIDES

This application is a continuation of application Ser. No. 07/968,531 filed Oct. 29, 1992, now abandoned.

BACKGROUND OF THE INVENTION

The present invention relates to adsorbents for efficiently removing nitrogen oxides (NOx) which are contained in low concentrations in gases discharged by ventilation from various highway tunnels, mountain tunnels, underwater tunnels, underground roads, sheltered roads and the like (hereinafter referred to collectively as "highway tunnels").

Highway tunnels, especially those having a large length and a great vehicular traffic volume, must be ventilated at a considerable rate in order to assure the health of drivers and passengers and increase the least distance of distinct vision. Air is withdrawn also from tunnels of relatively short length for ventilation to control air pollution due to carbon monoxide (CO), NOx and the like which are concentrically released from the inlet and outlet of the tunnel when the tunnel is located in an urban or suburban area.

However, if the gas discharged by ventilation is released as it is in the neighborhood, the environment of the area concerned will not be improved. Exactly the same problem as above will be encountered in the case where roadway tunnels or sheltered tunnels are to be constructed as a pollution control measure for existing roads.

The present invention relates to adsorbents for efficiently removing NOx which is present in low concentrations in gases removed from highway tunnels by ventilation.

PRIOR ART

The gas released from highway tunnels by ventilation is characterized in that it has a low NOx concentration of about 5 ppm and ordinary temperature, and varies greatly in quantity with the volume of traffic.

Processes have heretofore been investigated for removing NOx produced from fixed sources in order to purify the combustion exhaust gas from boilers. These processes are divided generally into the following three types.

(1) Catalytic Reduction Process

In this process, NOx in the exhaust gas is selectively reduced to harmless nitrogen and water vapor using ammonia as a reducing agent. This process is most generally used for denitrating exhaust gases from boilers. However, the gas to be treated by the process must be heated to at least 200° C., so that the process is not economical for treating gases from highway tunnels since the gas, having ordinary temperature and being large in quantity, needs to be heated with a large amount of energy.

(2) Wet Absorption Process

This process utilizes the fact that nitrogen dioxide ($NO_2$) and nitrogen trioxide ($N_2O_3$) can be readily absorbed by a liquid absorbent such as water or an aqueous alkali solution. Nitrogen monoxide is oxidized using the liquid absorbent with an oxidation catalyst or ozone injected into the absorbent, and the resulting $NO_2$ and $N_2O_3$ are caused to be absorbed by the absorbent, or the absorbent is used with an oxidizing agent added thereto. However, this process is complex because NOx is accumulated in the absorbent in the form of nitrates and nitrites, necessiating the maintanance and aftertreatment of the absorbent. The process further has an economical problem since the cost of the oxidizing agent per mole is higher than that of ammonia for use in the catalytic reduction process.

(3) Dry Adsorption Process

This process removes NOx from the exhaust gas with use of a suitable adsorbent. Several processes of this type had been investigated before the catalytic reduction process was placed into wide use for denitrating boiler exhaust gases. Nevertheless, since the boiler exhaust gas has (a) a high NOx concentration, (b) a high temperature, and (c) a high water content, the dry adsorption process is economically inferior to the catalytic reduction process and has not been introduced into use.

However, when the dry adsorption process was evaluated for purifying the gas resulting from the ventilation of highway tunnels, the process was found simple but economical, and entirely different from the same process as applied to the treatment of boiler exhaust gases.

We have already proposed adsorbents intended to efficiently adsorb and remove NOx present in a low concentration of 5 ppm, i.e., a low-concentration NOx adsorbent which comprises at least one copper salt supported on natural or synthetic zeolite and selected from among copper chloride, double salts of copper chloride and amine complex salt of copper chloride (see Unexamined Japanese Patent Publication No. 299642/1989), and an adsorbent which comprises vanadium supported on a carrier of anatase-type titania (see the specification of Japanese Patent Application No. 340627/1990).

However, these adsorbents have the problem of exhibiting an impaired adsorbing property (deterioration) when used at an increased water (or moisture) content as shown in FIG. 24. (FIG. 24 shows the influence of the moisture content on the adsorbing property of the above-mentioned Cu-supporting zeolite and V-supporting titania. The reaction conditions are 5 ml of adsorbent, 2.5 NL/min of reactive gas, NOx concentration of 3.8 to 4.1 ppm, moisture content of about 60 ppm or about 500 ppm and reaction temperature of 24° to 26° C.)

Accordingly, to enable these adsorbents to exhibit a satisfactory adsorbing property, the moisture content of gases needs to be not higher than about −35° C. in terms of dew point (up to about 200 ppm), so that the gas to be treated must be dehumidified by a dehumidifying step before the removal of NOx.

An object of the present invention is to provide an adsorbent which is free of the influence of moisture for removing NOx.

Another object of the invention is to provide such an adsorbent which is free of poisoning with SOx present in the gas to be treated.

Still another object of the invention is to provide such an adsorbent which comprises a ruthenium halide and which retains high activity for a prolonged period of time without permitting the separation of the halogen.

SUMMARY OF THE INVENTION

The present invention provides a first agent for removing low-concentration NOx by adsorption. (Such agents will hereinafter be referred to merely as "adsorbers.") The first adsorbent comprises a carrier comprising gamma-alumina, and ruthenium supported on the carrier.

The invention provides a second adsorbent which comprises a carrier comprising anatase-type titania, and ruthenium supported on the carrier.

The invention provides a third adsorbent which comprises ceramic paper holding thereto a carrier comprising anatase-type titania, and ruthenium supported on the ceramic paper.

The invention provides a fourth adsorbent which comprises ceramic paper holding thereto a carrier comprising anatase-type titania, and a ruthenium halide and a halide of at least one addition metal co-supported on the ceramic paper, the addition metal being selected from the group consisting of potassium, sodium, magnesium, calcium, manganese, copper, zinc, rubidium, zirconium, barium, cerium and molybdenum. (The halide of addition metal will hereinafter be referred to as an "addition metal halide.")

The first to fourth adsorbents are not affected by moisture, so that the dehumidifying step which must be executed conventionally before the removal of NOx with use of a large amount of energy can be dispensed with or carried out to a diminished extent. This achieves great savings in energy and savings in the space needed (reduction in the size of equipment) unlike the conventional process. The NOx adsorbed by the adsorbent can be readily desorbed by heating to facilitate regeneration of the adsorbent. Accordingly, the adsorbents of the invention are suited for use with NOx adsorption rotors for continually and repeatedly adsorbing NOx and desorbing NOx (for regeneration).

The second, third and fourth adsorbents comprise a carrier of anatase-type titania, are therefore unlikely to be poisoned with SOx in the gas to be treated and exhibit excellent durability.

The third adsorbent is superior to adsorbents comprising a granular titania carrier in NOx adsorbing property relative to the weight of $TiO_2$ and also to the amount of Ru supported, and is more advantageous in that the NOx adsorbed can be removed at a lower temperature for facilitated regeneration. The fourth adsorbent is more superior in these features.

The fourth adsorbent retains full activity even when exposed to an atmosphere having a high temperature of 250° C. for 100 hours. The adsorbent is therefore especially suited for use with the NOx adsorbing rotor.

DESCRIPTION OF THE PREFERRED EMBODIMENTS

Figure 1:
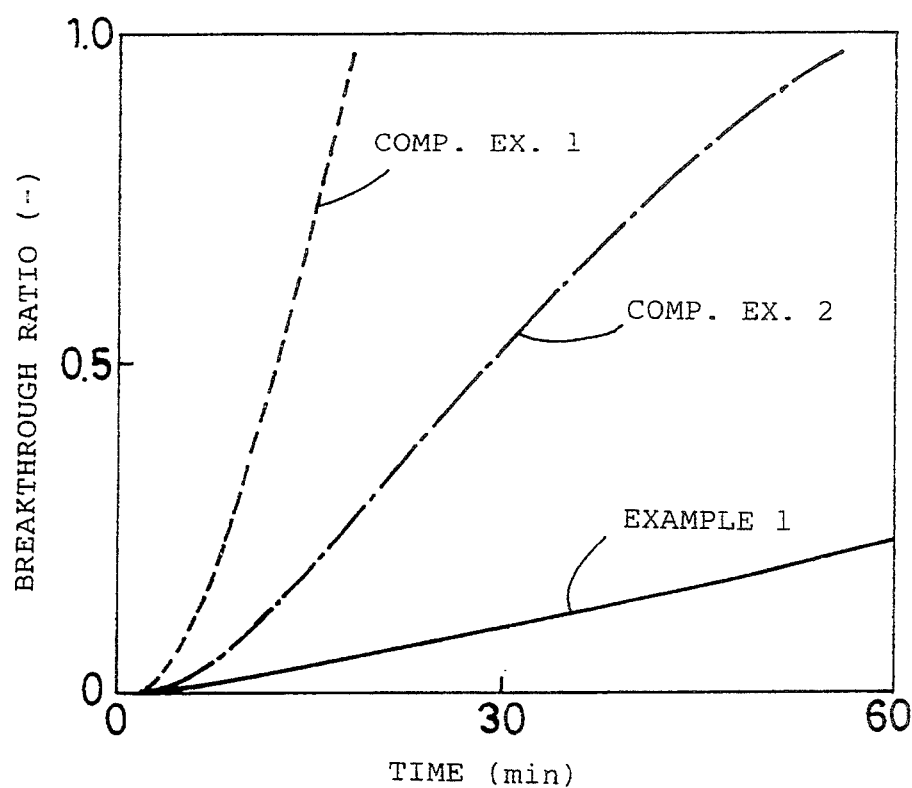
FIG. 1 is a graph showing a relation between the time and the breakthrough ratio.

The first adsorbent of the present invention comprises a carrier comprising gamma-alumina, and ruthenium supported thereon.

When desired, the carrier may contain, in addition to gamma-alumina, organic auxiliary forming agents, inorganic forming agents (serving as binders or diluents) such as silica sol and silica-alumina, and inorganic fibrous substances such as ceramic fibers.

The carrier is prepared by kneading the alumina with such an auxiliary forming agent and fibrous substance which are used as required, then forming the mixture into a desired shape, and drying and baking the shaped mixture.

The gamma-alumina carrier may be a commercial alumina carrier, or an alumina carrier prepared from alumina sol.

Ruthenium is supported on the carrier preferably in an amount, calculated as ruthenium metal, of at least about 0.01 wt. %, more preferably about 0.1 to about 5 wt. % based on the adsorbent. The amount of ruthenium to be supported is adjusted generally by varying the ruthenium concentration of the immersion bath to be used, temperature of the bath, immersion time or the like.

The carrier is caused to support ruthenium thereon generally by dissolving or dispersing ruthenium chloride ($RuCl_3$) or like ruthenium compound in a suitable medium to obtain an immersion bath, and immersing the alumina carrier in the bath, although this method is not limitative.

The immersed carrier is thereafter withdrawn from the bath, washed with water and dried in air at about 100° to about 120° C. The dried product is baked at about 300° to about 500° C. when so required. When the adsorbent is to be used continuously by repeating adsorption and desorption for regeneration, it is sometimes desirable to treat the dried product at a temperature slightly higher than the highest temperature at which the adsorbent is to be used.

The shape of the adsorbent is not limited specifically. Preferably it is shaped to have a large contact area and permit smooth passage of gases therethrough, as is the case with solid cylinders, balls, Raschig rings or a honeycomb structure.

The second adsorbent of the present invention comprises a carrier comprising anatase-type titania, and ruthenium supported on the carrier.

Examples of anatase-type titanias useful as carriers are commercial titania carriers, titania prepared from hydrated titania (titanic acid slurry) which is an intermediate product from the sulfuric acid process for producing titania, and titania prepared from titania sol obtained by deflocculating and stabilizing the titanic acid slurry.

When desired, the carrier may contain, in addition to anatase-type titania, organic auxiliary forming agents, inorganic forming agents (serving as binders or diluents) such as alumina sol, alumina, silica sol, silica-alumina and the like, and inorganic fibrous substances such as ceramic fibers.

The carrier is prepared by kneading the titania with such an auxiliary forming agent and fibrous substance which may be used as required, then forming the mixture into a desired shape, and drying and baking the shaped mixture.

The second adsorbent is the same as the first adsorbent with respect to the amount of ruthenium to be supported, supporting method, shape of the adsorbent, drying and baking conditions to be employed after immersion.

The third adsorbent of the invention comprises ceramic paper holding thereto a carrier comprising anatase-type titania, and ruthenium supported on the ceramic paper.

The third adsorbent is prepared by impregnating ceramic paper with anatase-type titania sol, drying or baking the impregnated ceramic paper, subsequently impregnating the carrier-holding ceramic paper with ruthenium, and drying or baking the resulting ceramic paper.

The ceramic paper is prepared from ceramic fibers by the papermaking process. Ceramic papers commercially available are also usable.

The anatase-type titania for use in the third adsorbent is the same as the one for use in the second adsorbent.

The adsorbent tends to exhibit a higher NOx adsorbing property as the amount of anatase-type titania retained thereon increases. If the amount of anatase-type titania is less than 20 g/m$^2$, a markedly impaired NOx adsorbing property will result, so that the amount is preferably at least 20 g/m$^2$, more preferably 25 to 500 g/m$^2$.

The third adsorbent is the same as the first adsorbent with respect to the amount of ruthenium to be supported, supporting method, drying and baking conditions to be employed after immersion, etc.

The fourth adsorbent of the present invention comprises ceramic paper holding thereto a carrier comprising anatase-type titania, and a ruthenium halide and the above-mentioned addition metal halide which are co-supported on the ceramic paper.

The fourth adsorbent is prepared by impregnating ceramic paper with anatase-type titania sol to cause the paper to retain the sol, drying or baking the impregnated ceramic paper, subsequently impregnating the carrier-holding ceramic paper with the ruthenium halide and addition metal halide, and drying or baking the resulting paper.

The fourth adsorbent is the same as the third adsorbent with respect to the ceramic paper, anatase-type titania and the amount thereof to be held to the paper.

The amount of ruthenium to be supported is preferably at least about 0.01 wt. %, more preferably about 0.1 to about 5 wt. %, calculated as ruthenium metal and based on the adsorbent.

The amount of addition metal halide to be supported is preferably at least about 0.1 wt. %, more preferably about 1 to about 10 wt. %, calculated as the metal and based on the adsorbent.

The ruthenium halide and the addition metal halide are caused to be co-supported on the ceramic paper generally by dissolving or dispersing the ruthenium halide, such as ruthenium chloride ($RuCl_3$), and the addition metal halide, such as the chloride of the above-mentioned metal, in a suitable medium to obtain an immersion bath of the mixture, and immersing the carrier in the bath. This method, however, is not limitative.

The drying or baking conditions to be employed after the immersion, etc. are the same as those described for the first adsorbent.

In treating large quantities of gases such as ventilation gases from highway tunnels, it is required that the adsorbent be diminished in the resistance to the gas flow to ensure a minimized pressure loss. The first adsorbent preferable for use in this case is an adsorbent which comprises a flat sheet-corrugated sheet multilayer structure having a honeycomb cross section, and ruthenium supported thereon, the multilayer structure being composed of alternately arranged flat sheets of ceramic paper retaining a carrier of gamma-alumina thereon and corrugated sheets of ceramic paper retaining the same carrier thereon. Also preferred as the second and third adsorbents are those which comprise a flat sheet-corrugated sheet multilayer structure having a honeycomb cross section, and ruthenium supported-thereon, the multilayer structure being composed of alternately arranged flat sheets of ceramic paper retaining a carrier of anatase-type titania thereon and corrugated sheets of ceramic paper retaining the same carrier thereon. Further preferred as the fourth adsorbent is one comprising a flat sheet-corrugated sheet multilayer structure having a honeycomb cross section, and a ruthenium halide and an addition metal halide co-supported on the structure, the multilayer structure being composed of alternately arranged flat sheets of ceramic paper retaining a carrier of anatase-type titania thereon and corrugated sheets of ceramic paper retaining the same carrier thereon.

The first to fourth adsorbents embodying the present invention are used for removing NOx present in a low concentration in the ventilation gas of highway tunnels by contact with the gas. The adsorbent having NOx adsorbed thereto can be heated for the desorption of NOx, and the regenerated adsorbent is exposed to the ventilation gas for a continuous treatment.

EXAMPLE 1

Commercial gamma-alumina (brand name, Sanbido-AN, product of Shokubai Kagakukogyo Co., Ltd.) as comminuted and sieved to 8- to 14-mesh sizes was immersed in an amount of 7 ml in 10 ml of an aqueous solution of ruthenium chloride ($RUCl_3$), 0.38 wt. % in Ru concentration, at room temperature for 20 hours. The alumina was then washed with water and thereafter dried at about 110° C. for 2 hours to obtain a Ru-supporting alumina adsorbent (amount of Ru supported: 0.6 wt. %).

A 5-ml quantity (3.5 g) of the adsorbent was packed in a stainless steel reactor tube having an inside diameter of 22 mm, treated at about 300° C. for 1 hour while passing dry air (moisture content: about 50 ppm) through the tube at a rate of 2.5 NL/min and then allowed to cool to room temperature. After cooling, the passage of dry air was discontinued, and air adjusted to a moisture content of 500 ppm and containing 3.5 ppm of NOx was introduced into the adsorbent layer at a rate of 2.5 NL/min. Immediately after the start of introduction, the outlet gas of the reactor tube was checked for NOx concentration by a chemiluminescent detector. FIG. 1 shows variations in the NOx concentration of the outlet gas with time. Plotted as ordinate in FIG. 1 is a value obtained by dividing the NOx concentration of the outlet gas by the NOx concentration of the inlet gas. (The value will hereinafter be referred to as a "breakthrough ratio.")

The drawing, showing the result of Example 1, indicates that the time taken for the NOx concentration of the outlet gas to reach 10% of the concentration at the inlet (breakthrough ratio: 0.1), i.e., 0.35 ppm, is 30.0 minutes. (The time will be referred to as "10% breakthrough time.")

COMPARATIVE EXAMPLES 1 AND 2

An adsorbent comprising vanadium (V) supported on titania was prepared by heating a titanic acid slurry ($TiO_2$ content: about 30 wt. %) in air at 400° C. for 5 hours to obtain anatase-type titanium oxide (titania) for use as a carrier, and impregnating the carrier with ammonium metavanadate ($NH_4VO_3$). The adsorbent was used under the same conditions as in Example 1 to measure the outlet NOx concentration similarly. FIG. 1 also shows variations in this concentration with time as the result of Comparative Example 1.

Further a Cu-supporting zeolite adsorbent was prepared by impregnating commercial Y-type zeolite serving as a carrier with cupric chloride ($CuCl_2$). This adsorbent was used under the same conditions as in Example 1 to measure the outlet NOx concentration similarly. FIG. 1 shows variations in the NOx concentration with time thus determined as the result of Comparative Example 2.

The drawing reveals that at a moisture content of 500 ppm, the Ru-supporting alumina adsorbent (Example 1) exhibits an exceedingly higher property than the V-supporting titania adsorbent (Comparative Example 1) and the Cu-supporting zeolite adsorbent (Comparative Example 2).

EXAMPLE 2

Figure 2:
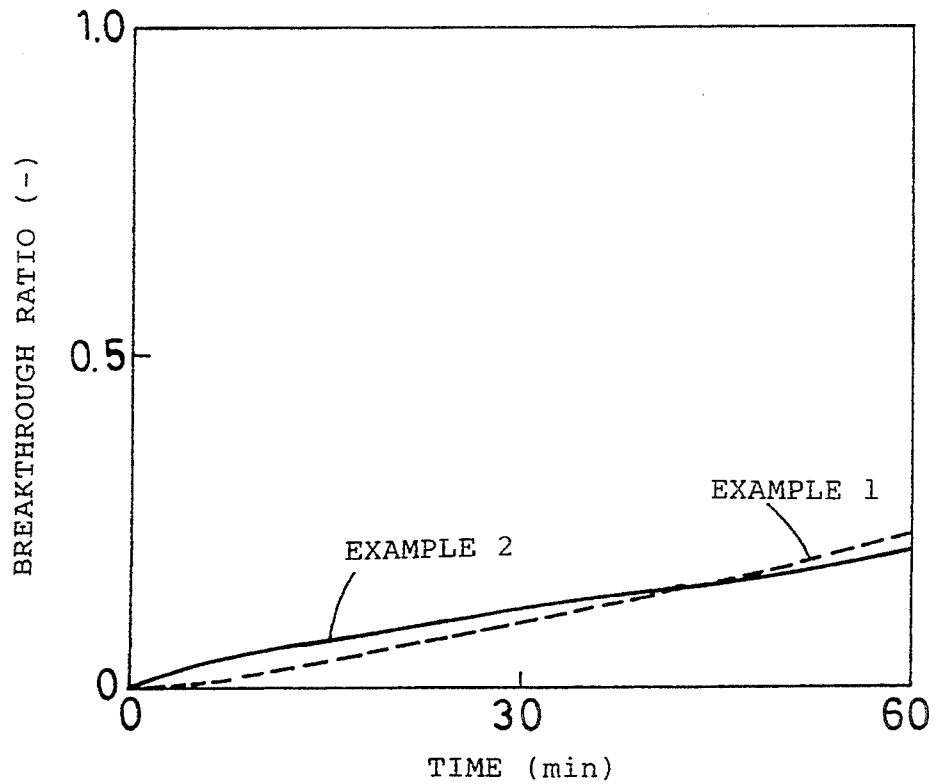
FIG. 2 is a graph showing a relation between the time and the breakthrough ratio.

An adsorbent was prepared in the same manner as in Example 1 using a gamma-alumina carrier which was obtained by pelletizing "Colloidal Alumina 200," manufactured by Nissan Chemical Industries, Ltd, drying the pelletized alumina at about 110° C. for 44 hours and thereafter baking the alumina in air at 400° C. for 24 hours. This adsorbent was used under the same conditions as in Example 1 to measure the outlet NOx concentration similarly. FIG. 2 shows variations in the NOx concentration with time thus determined as the result of Example 2.

The diagram reveals that the alumina carrier prepared from colloidal alumina (alumina sol, Example 2) and the commercial alumina carrier are both usable as such with no noticeable difference found therebetween in the NOx adsorbing property.

EXAMPLE 3

Figure 3:
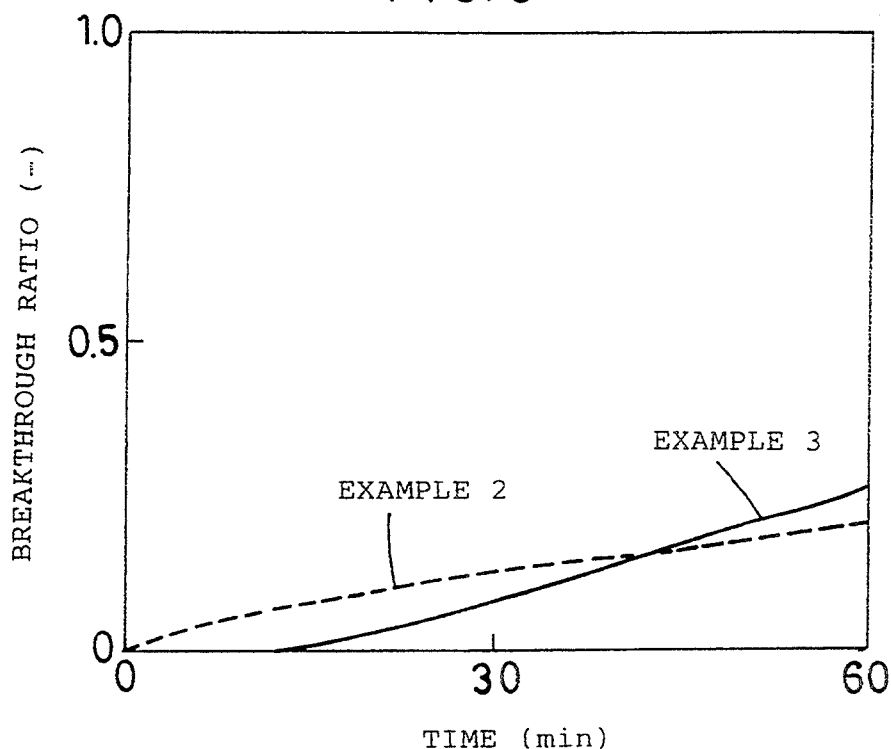
FIG. 3 is a graph showing a relation between the time and the breakthrough ratio.

A 5-ml quantity (3.5 g) of an adsorbent prepared in the same manner as in Example 2 was packed in a stainless steel reactor tube having an inside diameter of 22 mm, treated at about 300° C. for 1 hour while passing dry air (moisture content: about 50 ppm) through the tube at a rate of 2.5 NL/min and then allowed to cool to room temperature. After cooling, the passage of dry air was discontinued, and air (temperature: 24.5° C., relative humidity: 49%, moisture content: about 15,000 ppm) containing 3.5 ppm of NOx was introduced into the adsorbent layer at a rate of 2.5 NL/min. Immediately after the start of introduction, the gas from the outlet of the reactor tube was checked for NOx concentration. FIG. 3 shows variations in the NOx concentration of the outlet gas with time as the result of Example 3 along with the result achieved in Example 2 (moisture content: 500 ppm).

The diagram reveals that the adsorbent retains its NOx adsorbing property even at an increased water content, ensuring efficient removal of NOx at the moisture content of the atmosphere.

EXAMPLE 4

The same carrier as used in Example 2 was crushed and sieved to 8- to 14-mesh sizes, then immersed in an aqueous ruthenium chloride solution of specified concentration at room temperature for 20 hours, washed with water and thereafter dried. In this way, adsorbents were prepared with varying amounts of Ru supported on the carrier.

Figure 4:
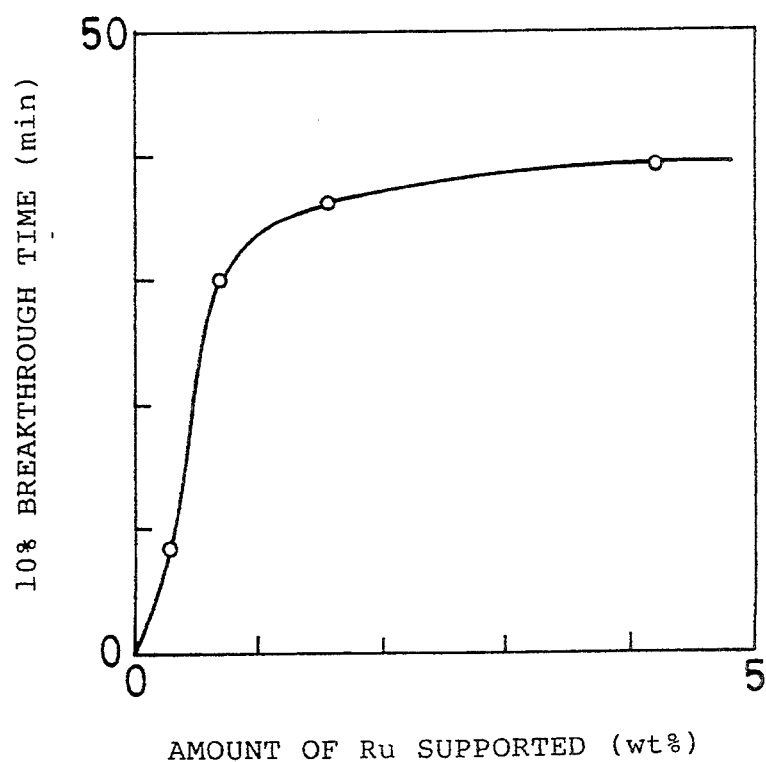
FIG. 4 is a graph showing a relation between the amount of Ru supported and the breakthrough time.

A 5-ml quantity (3.5 g) of each of these adsorbents was packed in a stainless steel reactor tube having an inside diameter of 22 mm and used under the same conditions as in Example 1 to measure the outlet NOx concentration and determine 10% breakthrough time. FIG. 4 shows the relation between the amount of Ru supported and the 10% breakthrough time thus established.

The diagram reveals that as the amount of Ru supported increases, the 10% breakthrough time increases to result in a higher NOx adsorbing property. It is seen, however, that when the amount of Ru exceeds about 3 wt. %, the 10% breakthrough time becomes almost definite.

EXAMPLE 5

A 7-ml quantity of commercial anatase-type titania (product of Shokubai Kagakukogyo Co., Ltd., 144.4 $m^2/g$ in specific surface area) as crushed and sieved to 8- to 14-mesh sizes was immersed in 10 ml of an aqueous solution of ruthenium chloride ($RuCl_3$), 0.38 wt. % in Ru concentration, at room temperature for 20 hours. The titania was then washed with water and thereafter dried at about 110° C. for 2 hours to obtain a Ru-supporting anatase-type titania adsorbent (amount of Ru supported: 0.24 wt. %).

Figure 5:
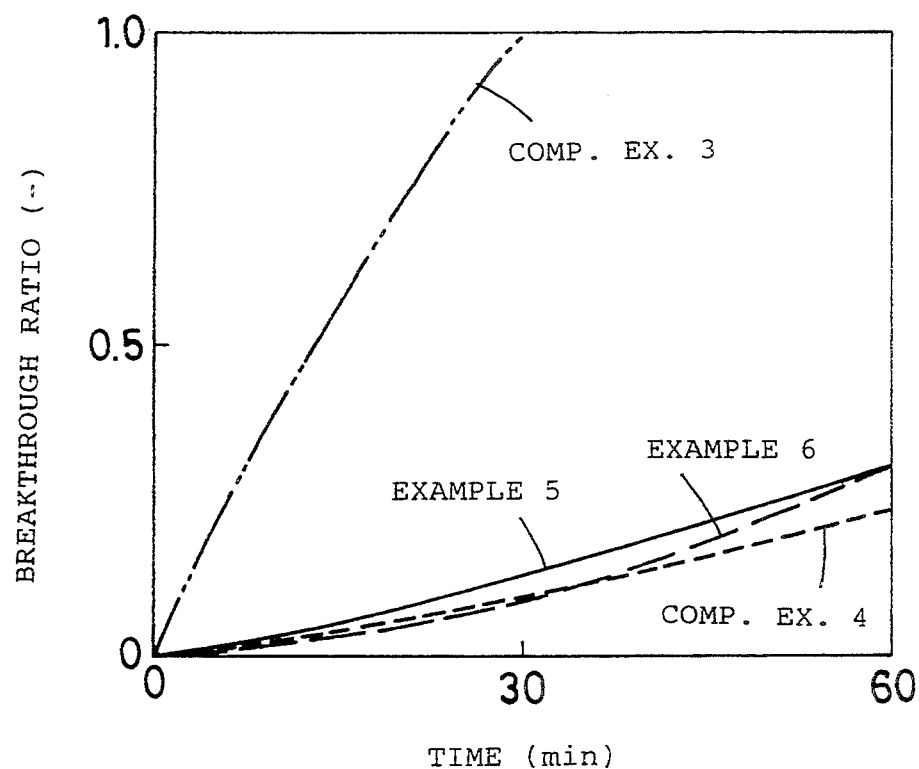
FIG. 5 is a graph showing a relation between the time and the breakthrough ratio.

A 5-ml quantity (4.2 g) of the adsorbent was packed in a stainless steel reactor tube having an inside diameter of 22 mm, treated at about 300° C. for 1 hour while passing dry air (moisture content: about 50 ppm) through the tube at a rate of 2.5 NL/min and then allowed to cool to room temperature. After cooling, the passage of dry air was discontinued, and air adjusted to a moisture content of 500 ppm and containing 3.5 ppm of NOx was introduced into the adsorbent layer at a rate of 2.5 NL/min. Immediately after the start of introduction, the gas at the outlet of the reactor tube was checked for NOx concentration by a chemiluminescent detector. FIG. 5 shows variations in the NOx concentration of the outlet gas with time.

The diagram, showing the result of Example 5, indicates that the time (10% breakthrough time) taken for the NOx concentration of the outlet gas to reach 10% of the concentration at the inlet (breakthrough ratio: 0.1), i.e., 0.35 ppm, is 24.0 minutes.

EXAMPLE 6

A titania sol ($TiO_2$ content: about 30 wt. %) was heated in air at 400° C. for 3 hours to obtain anatase-type titania (specific surface area: 99.3 $m^2/g$), which was comminuted and sieved to obtain an 8- to 14-mesh fraction. A Ru-supporting anatase-type titania adsorbent (amount of Ru supported: 0.21 wt. % was prepared by the same procedure as in Example 5 with the exception of using the anatase-type titania powder obtained as a carrier.

The adsorbent was used under the same conditions as in Example 5 to measure the outlet NOx concentration similarly. FIG. 5 shows variations in the NOx concentration with time thus measured as the result of Example 6. The drawing shows that the breakthrough time determined for Example 6 was 31.3 minutes.

COMPARATIVE EXAMPLE 3

The same commercial anatase-type titania as used in Example 5 was crushed and sieved to obtain an 8- to 14-mesh fraction, which was used as it was as an adsorbent to measure the outlet NOx concentration under the same conditions as in Example 5. FIG. 5 shows variations in the NOx concentration with time thus measured as indicated as Comparative Example 3. With Comparative Example 3 illustrated, the breakthrough time was 2.2 minutes. This shows that the adsorbent is almost unable to adsorb NOx for removal at a high moisture content of 500 ppm.

COMPARATIVE EXAMPLE 4

A Ru-supporting gamma-alumina adsorbent (amount of Ru supported: 0.68 wt. %) was prepared by the same procedure as in Example 5 except that the carrier used was commercial gamma-alumina (Sanbido AN, product of Shokubai Kagakukogyo Co., Ltd.) as crushed and sieved to 8- to 14-mesh sizes.

The adsorbent was used under the same conditions as in Example 5 to measure the outlet NOx concentration similarly. FIG. 5 shows variations in the NOx concentration with time thus measured as indicated as Comparative Example 4. With Comparative Example 4, the breakthrough time was 30.0 minutes as illustrated.

Evaluation of the Property

The curves shown in FIG. 5 reveal that the adsorbents of Examples 5 and 6 are comparable to the Ru-supporting gamma-alumina adsorbent of Comparative Example 4 in NOx adsorbing property and serve the function even at a high moisture content of 500 ppm. A comparison between Examples 5 and 6 shows a slight difference therebetween in NOx adsorbing property due to differences involved in the conditions for preparing the titania carriers. However, it is seen that the adsorbents having different titania carriers both efficiently adsorb NOx.

EXAMPLES 7, 8 AND 9

A Ru-supporting titania adsorbent (amount of Ru supported: 0.16 wt. %) was prepared by the same procedure as in Example 5 except that the carrier used was prepared in the same manner as in Example 6 by heating a titania sol (TiO content: about 30 wt. %) in air at 400° C. for 3 hours to obtain anatase-type titania, and comminuting and sieving the titania to 8- to 14-mesh sizes.

Figure 6:
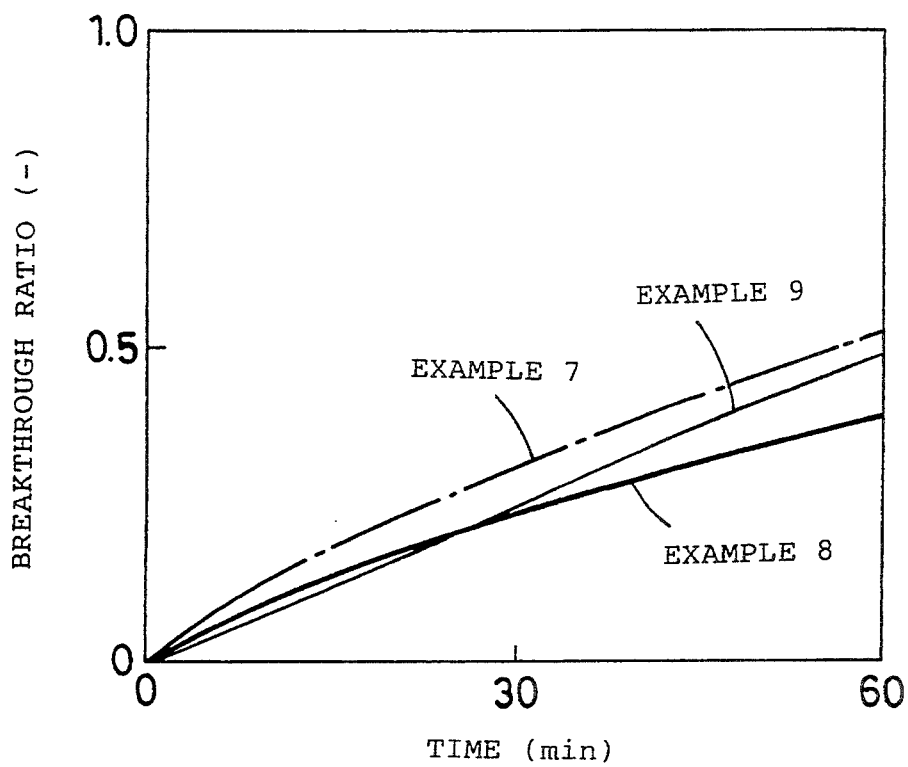
FIG. 6 is a graph showing a relation between the time and the breakthrough ratio.

A portion of this adsorbent was used under the same conditions as in Example 5 to measure the outlet NOx concentration similarly. FIG. 6 shows variations in the NOx concentration with time thus measured as indicated as Example 7.

A 5-ml quantity (4.2 g) of the same adsorbent as used in Example 7 was packed in a stainless steel reactor tube having an inside diameter of 22 mm, and dry air was passed through the tube under the same conditions as in Example 5, followed by cooling and interruption of the passage of the dry air. Air adjusted to a moisture content of 1,000 ppm, containing 3.5 ppm of NOx and serving as a reactive gas was introduced into the adsorbent layer at a rate of 2.5 NL/min, and checked for NOx concentration at the outlet of the reactor tube. FIG. 6 shows variations in this concentration with time thus measured, as indicated as Example 8.

Further the same procedure as in Example 8 was repeated with the exception of introducing air (temperature: 26° C., relative humidity: 56% moisture content: about 25,000 ppm) containing 3.5 ppm of NOx into the adsorbent layer at a rate of 2.5 NL/min as a reactive gas. FIG. 6 shows the measurements obtained, as indicated as Example 9.

Evaluation of the Property

FIG. 6 reveals that the adsorbent exhibits a high NOx adsorbing property free of deterioration even at higher moisture contents, efficiently removing NOx even at the moisture content of the atmosphere.

EXAMPLE 10

Figure 7:
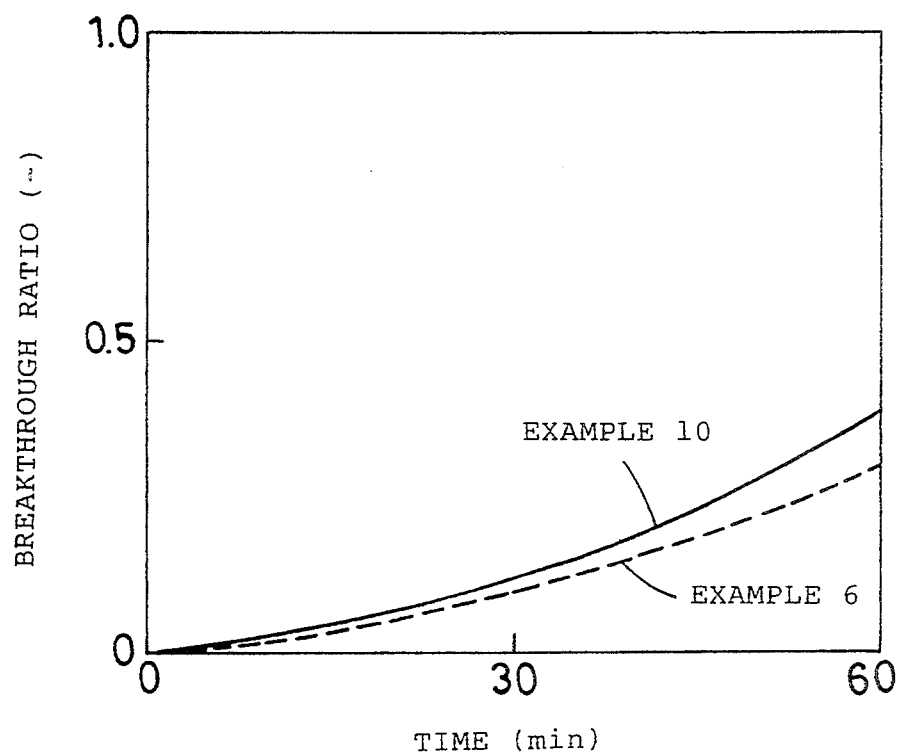
FIG. 7 is a graph showing a relation between the time and the breakthrough ratio.

The adsorbent used for adsorbing NOx by the procedure of Example 6 was treated at about 350° C. for 1 hour in a stream of air (2.5 NL/min) adjusted to a moisture content of 500 ppm to remove the adsorbed NOx from the adsorbent, which was then allowed to cool to room temperature. After cooling, the supply of the air with the moisture content of 500 ppm was discontinued, and air adjusted to a moisture content of 500 ppm and containing 3.5 ppm of NOx was introduced into the adsorbent layer at 2.5 NL/min. Immediately after the start of introduction, the outlet gas was checked for NOx concentration. FIG. 7 shows variations in the NOx concentration of the outlet gas with time thus measured, as indicated as Example 10.

Evaluation of the Property

FIG. 7 shows that the NOx adsorbed by the adsorbent can be desorbed by heating the adsorbent in an air stream to readily regenerate the adsorbent. This suggests that the adsorbent is continuously usable through repetitions of adsorption and regeneration. The adsorbent is therefore usable with an NOx adsorption rotor for use in the apparatus proposed by the present inventors for purifying the ventilation gas from highway tunnels (see Unexamined Japanese Patent Publication No. 26616/1990).

Amount of Ru Supported

The same titania as used in Example 6 was crushed and sieved to 8- to 14-mesh sizes, then immersed in an aqueous ruthenium chloride solution of specified concentration at room temperature for 20 hours, washed with water and thereafter dried. In this way, adsorbents were prepared which were different from 0 to 5 wt. % in the amount of Ru supported on the carrier.

Figure 8:
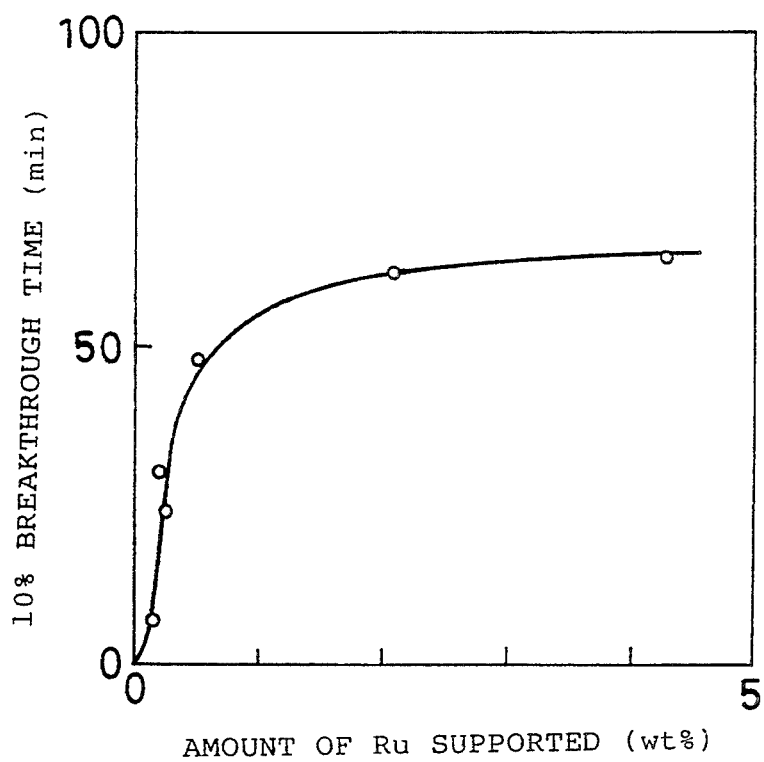
FIG. 8 is a graph showing a relation between the amount of Ru supported and the 10% breakthrough time.

A 5-ml quantity (4.2 g) of each of these adsorbents was packed in a stainless steel reactor tube having an inside diameter of 22 mm and used under the same conditions as in Example 5 to measure the outlet NOx concentration and determine 10% breakthrough time. FIG. 8 shows the relation between the amount of Ru supported and the 10% breakthrough time thus established.

The diagram reveals that as the amount of Ru supported increases, the 10% breakthrough time increases to result in a higher NOx adsorbing property. It is seen, however, that when the amount of Ru exceeds about 2 wt. %, the 10% breakthrough time becomes almost definite.

EXAMPLE 11

Commercial ceramic paper (manufactured by Japan Radio Co., Ltd., composed of silica and alumina (50:50), having a thickness of 0.25 mm and weighing 46 g/m$^2$) was cut to a predetermined size, and the cut sheet was immersed in an anatase-type titania sol (TiO$_2$ content: about 30 wt. %) at room temperature. The ceramic paper was thereafter immediately placed onto a flat plate, treated with a roller or the like to remove an excess of titania sol and thereby made uniform in thickness, and dried in hot air at the same time. The ceramic paper impregnated with the titania sol and thus prepared in the form of a flat sheet was placed into an electric oven and baked in air at 400° C. for 3 hours to obtain a flat sheet of titania-retaining ceramic paper.

The same ceramic paper as above and immersed in the anatase-type titania sol was withdrawn from the sol, placed on a corrugated plate and thereafter treated in the same manner as above to obtain a corrugated sheet of titania-retaining ceramic paper.

The amount of TiO$_2$ retained on the paper was determined from the difference between the weight of paper before the immersion in the titania sol and the weight thereof after baking, with the result that 85 g/m$^2$ of TiO$_2$ was found retained on the paper.

Figure 9:
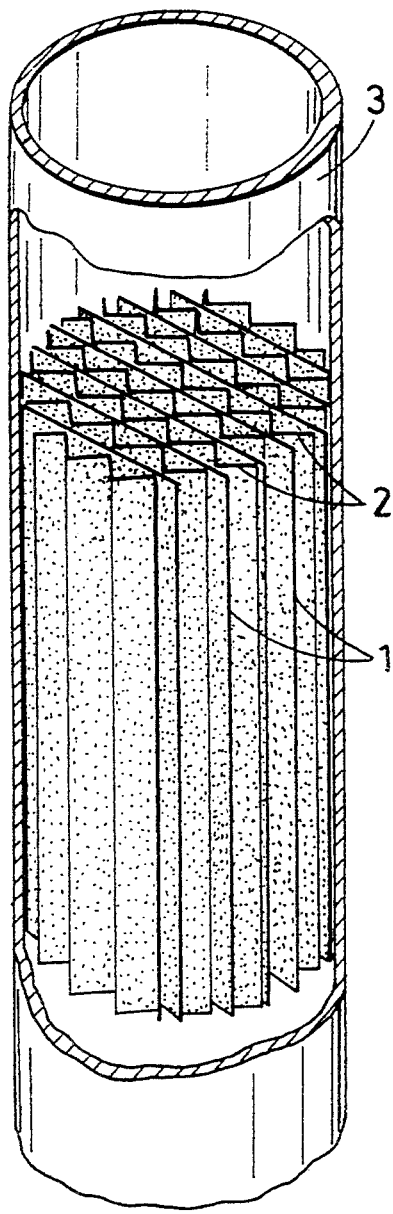
FIG. 9 is a perspective view showing an adsorbent of flat sheet-corrugated sheet multilayer structure.

The same procedure as above was repeated to prepare flat sheets of titania-retaining ceramic paper having varying widths and corrugated sheets of titania-retaining ceramic paper also having varying widths. Subsequently the flat sheets 1 and corrugated sheets 2 of predetermined widths were alternately arranged in layers into a cylindrical assembly as seen in FIG. 9 and temporarily held together with ceramic paper bands to obtain a flat sheet-corrugated sheet multilayer structure having a honeycomb cross section, externally measuring 22 mm in diameter and 50 mm in length, having a geometric surface area of 0.0385 m$^2$ and weighing 4.3 g (TiO$_2$ content: 3.3 g).

The multilayer structure was immersed in 100 ml of an aqueous solution of ruthenium chloride (RuCl$_3$), 0.38 wt. % in Ru concentration, at room temperature for 30 minutes, then washed with water and thereafter dried at about 110° C. for 2 hours to obtain a Ru-supporting titania honeycomb adsorbent (amount of Ru supported: 0.55 wt. %).

Figure 10:
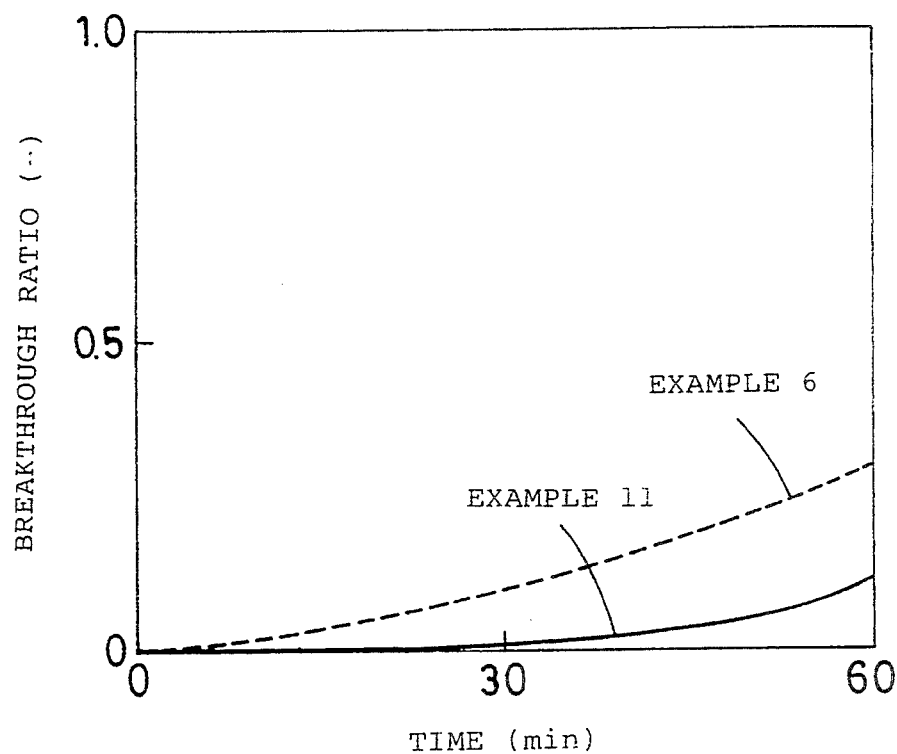
FIG. 10 is a graph showing a relation between the time and the breakthrough ratio.

The adsorbent was fitted into a stainless steel reactor tube 3 having an inside diameter of 22 mm with the holding bands removed. The adsorbent was subsequently treated at about 300° C. for 1 hour while passing dry air (moisture content: about 50 ppm) through the tube at 2.5 NL/min and then allowed to cool to room temperature. After cooling, the passage of dry air was discontinued, and air adjusted to a moisture content of 500 ppm and containing 3.5 ppm of NOx was introduced into the honeycomb adsorbent at 2.5 NL/min. Immediately after the start of introduction, the gas at the outlet of the reactor tube 3 was checked for NOx concentration by a chemiluminescent detector. FIG. 10 shows variations in the NOx concentration of the outlet gas thus measured with time, as indicated as Example 11.

As will be apparent from the drawing, the time (10% breakthrough time) taken for the NOx concentration of the outlet gas to reach 10% of the concentration at the inlet (breakthrough ratio: 0.1), i.e., 0.35 ppm, was 24.0 minutes.

With the adsorbent of Example 11 wherein ruthenium is supported on ceramic paper retaining an anatase-type titania carrier thereon, fine particles of titania are supported as uniformly dispersed over the entire wide area of the paper. FIG. 10 therefore shows that the adsorbent has a higher adsorbing property relative to the weight of titania than the adsorbent of Example 6 wherein granular titania carrier is used, effectively serving the function not only over the surface of the titania carrier but also in its interior.

EXAMPLE 12

Flat sheets and corrugated sheets of titania-retaining ceramic paper, 20 g/m$^2$ in the amount of TiO$_2$ retained thereon, were prepared in the same manner as in Example 11 except that the paper material was immersed in the anatase-type titanium sol a different number of times for an altered period of time.

By the same procedure as in Example 11, these flat sheets and corrugated sheets were made into a flat sheet-corrugated sheet multilayer structure externally measuring 22 mm in diameter and 50 mm in length and having a geometric surface area of 0.0417 m$^2$ and a weight of 4.2 g (TiO$_2$ content: 0.8 g).

The multilayer structure was caused to support ruthenium thereon in the same manner as in Example 11 to obtain Ru-supporting titania honeycomb adsorbent (amount of Ru supported: 0.13 wt. %).

Figure 11:
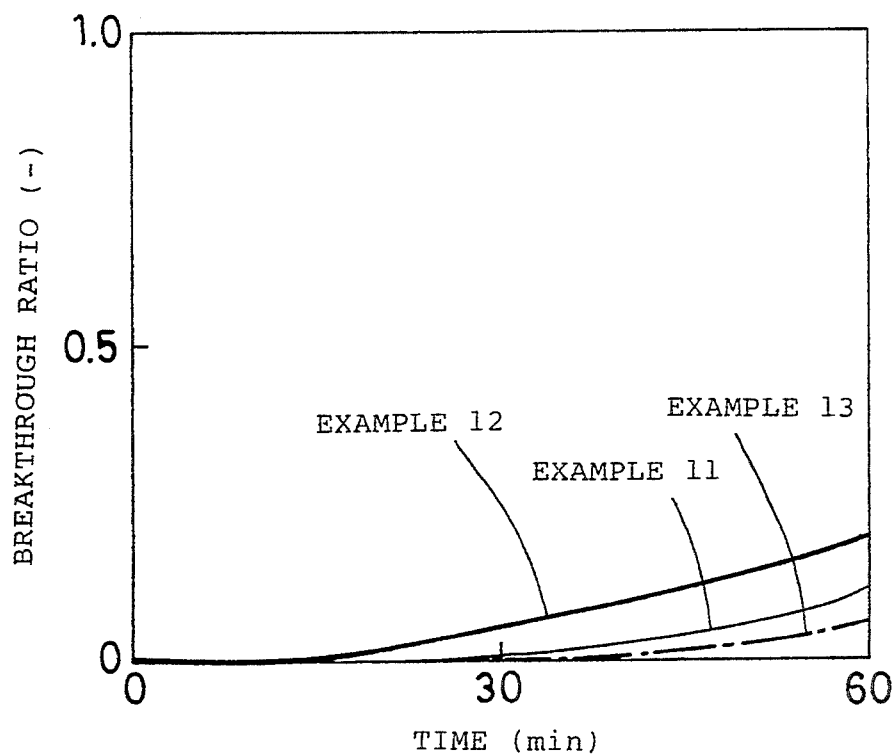
FIG. 11 is a graph showing a relation between the time and the breakthrough ratio.

As in Example 11, the adsorbent was fitted into a reactor tube, and the outlet NOx concentration was measured under the same conditions. FIG. 11 shows the measurements, as indicated as Example 12.

Figure 12:
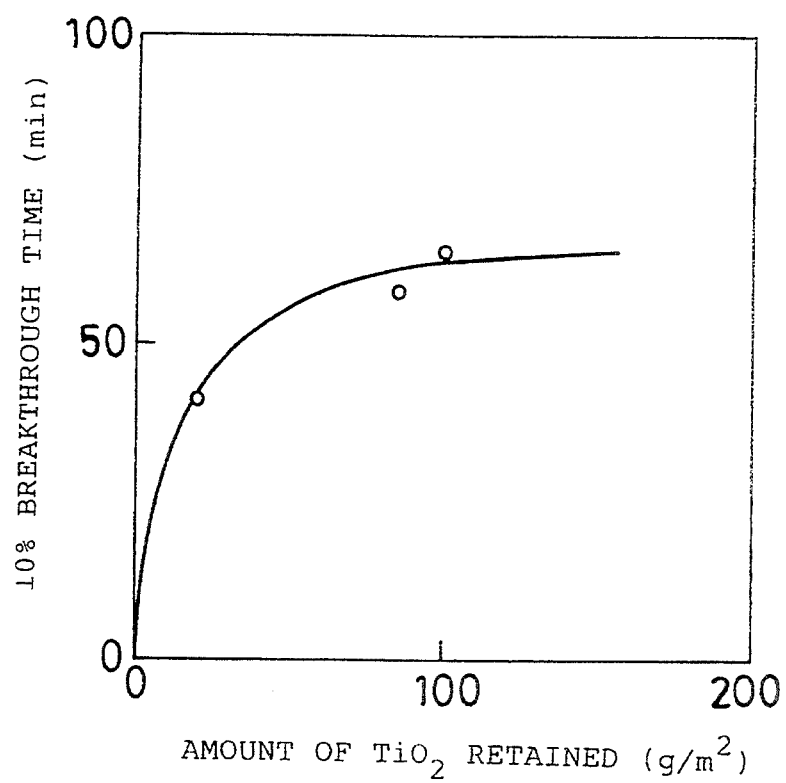
FIG. 12 is a graph showing a relation between the amount of $TiO_2$ supported and the 10% breakthrough time.

FIG. 12 further shows the relation between the amount of TiO$_2$ retained on the ceramic paper and the 10% breakthrough time.

EXAMPLE 13

Flat sheets and corrugated sheets of titania-retaining ceramic paper, 100 g/m² in the amount of TiO₂ retained thereon, were prepared in the same manner as in Example 11 except that the paper material was immersed in the anatase-type titanium sol a different number of times for an altered perod of time.

By the same procedure as in Example 11, these flat sheets and corrugated sheets were made into a flat sheet-corrugated sheet multilayer structure externally measuring 22 mm in diameter and 50 mm in length and having a geometric surface area of 0.0375 m² and a weight of 4.4 g (TiO₂ content: 3.8 g).

The multilayer structure was caused to support ruthenium thereon in the same manner as in Example 11 to obtain Ru-supporting titania honeycomb adsorbent (amount of Ru supported: 0.66 wt. %).

As in Example 11, the adsorbent was fitted into a reactor tube, and the outlet NOx concentration was measured under the same conditions. FIG. 11 shows the measurements, as indicated as Example 13.

FIG. 12 further shows the relation between the amount of TiO₂ retained on the ceramic paper and the 10% breakthrough time.

FIGS. 11 and 12 show that an increase in the amount of TiO₂ retained tends to result in a higher NOx adsorbing property. The amount of TiO₂ to be retained is preferably not smaller than 20 g/m² since amounts less than 20 g/m² entail markedly impaired NOx adsorbing properties.

Adsorbent Regeneration Temperature

Figure 13:
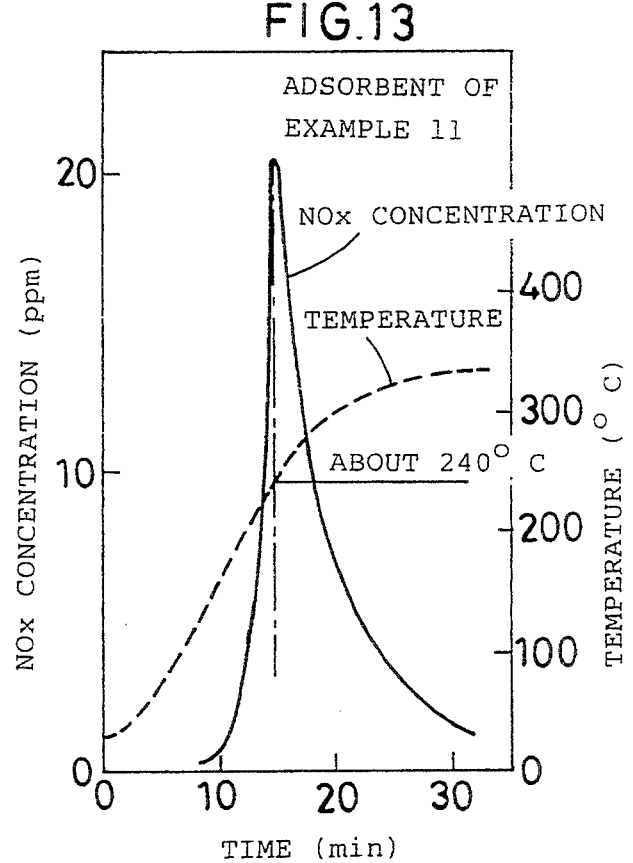
FIG. 13 is a graph showing a relation of the time with the NOx concentration and with the temperature.

After NOx was removed by the procedure of Example 11, the temperature of the adsorbent was raised while passing air adjusted to a moisture content of 500 ppm through the reactor tube at 2.5 NL/min. FIG. 13 shows the resulting variations in the NOx concentration of the outlet gas of the tube.

As will be apparent from the drawing, a rise in the temperature of the adsorbent increases the amount of NOx desorbed, consequently increasing the outlet NOx concentration greatly. As the amount of NOx remaining in the adsorbent thereafter decreases owing to desorption, the amount of NOx desorbed decreases to lower the outlet NOx concentration. Accordingly, the outlet NOx concentration is represented by a curve having a peak (desorption peak). In the case of the adsorbent of Example 11 used for the removal of NOx, the desorption peak after the removal was about 240° C.

Figure 14:
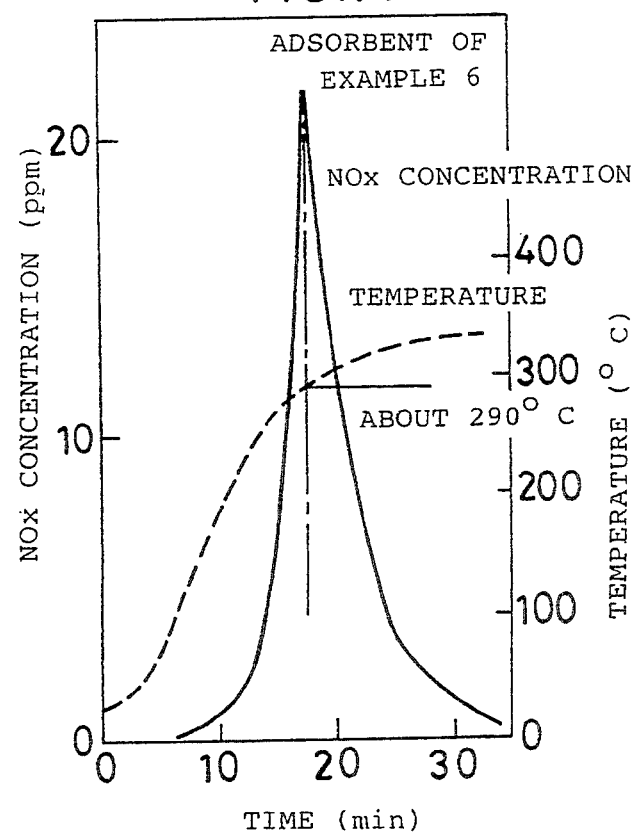
FIG. 14 is a graph showing a relation of the time with the NOx concentration and with the temperature.

In the case where the adsorbent of Example 6 was used for removing NOx and thereafter treated by the same desorption procedure as above, the desorption peak was about 290° C. as shown in FIG. 14.

This demonstrates that-the adsorbent of Example 11 which comprises titania-retaining ceramic paper permits removal of adsorbed NOx at a lower temperature and is easier to regenerate.

EXAMPLE 14

Figure 15:
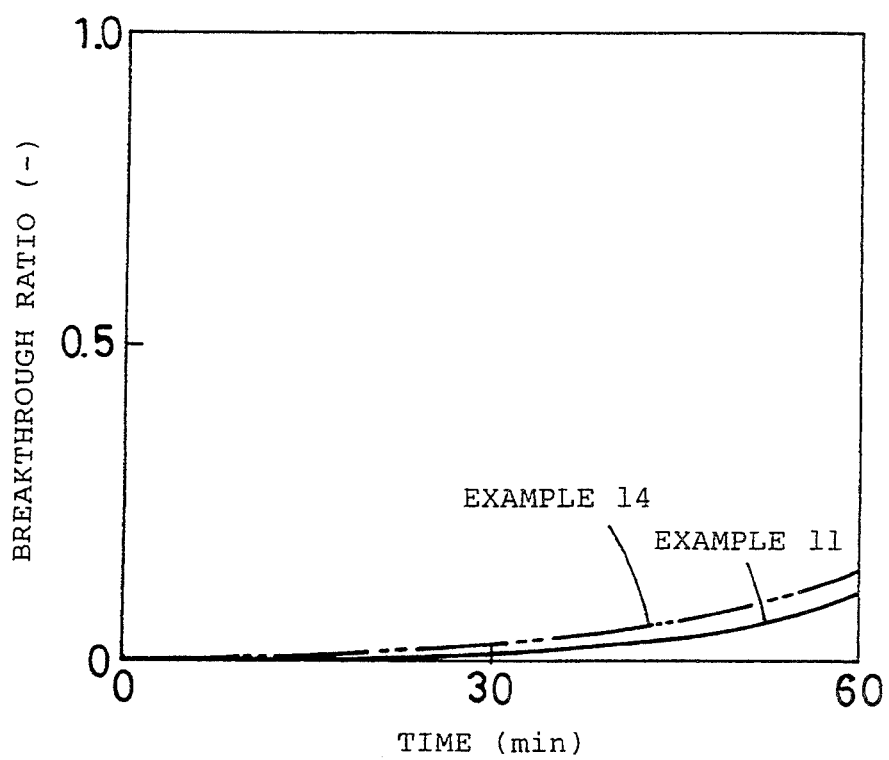
FIG. 15 is a graph showing a relation between the time and the breakthrough ratio.

The adsorbent as regenerated in Example 13 was allowed to cool to room temperature while passing air adjusted to a moisture content of 500 ppm through the reactor tube at 2.5 NL/min. With the passage of air thereafter discontinued, the NOx concentration of the reactor tube outlet gas was measured under the same condition as in Example 11. FIG. 15 shows the resulting variations in the NOx concentration with time, as indicated as Example 14.

FIG. 15 shows that the NOx adsorbed by the adsorbent can be desorbed by heating the adsorbent in an air stream to readily regenerate the adsorbent. This suggests that the adsorbent is continuously usable through repeated adsorption and desorption. The adsorbent is therefore usable with NOx adsorption rotors for use in the apparatus proposed by the present inventors for purifying the ventilation gas from highway tunnels (see Unexamined Japese Patent Publication No. 26616/1990).

EXAMPLE 15

A Ru-supporting titania adsorbent prepared by the same method as in Example 11 was fitted into a reactor tube as in Example 11, dried under the same condition and then allowed to cool. With the pasage of dry air thereafter discontinued, air adjusted to a moisture content of about 22,000 ppm (temperature: 26.0° C., relative humidity: 51%) and containing 3.5 ppm of NOx was introduced into the adsorbent at 2.5 NL/min as a reactive gas to measure the NOx concentration in the reactor tube outlet gas. FIG. 15 shows the resulting variations in the concentration with time, as indicated as Example 16, along with the result of Example 11 (moisture content: 500 ppm).

Figure 16:
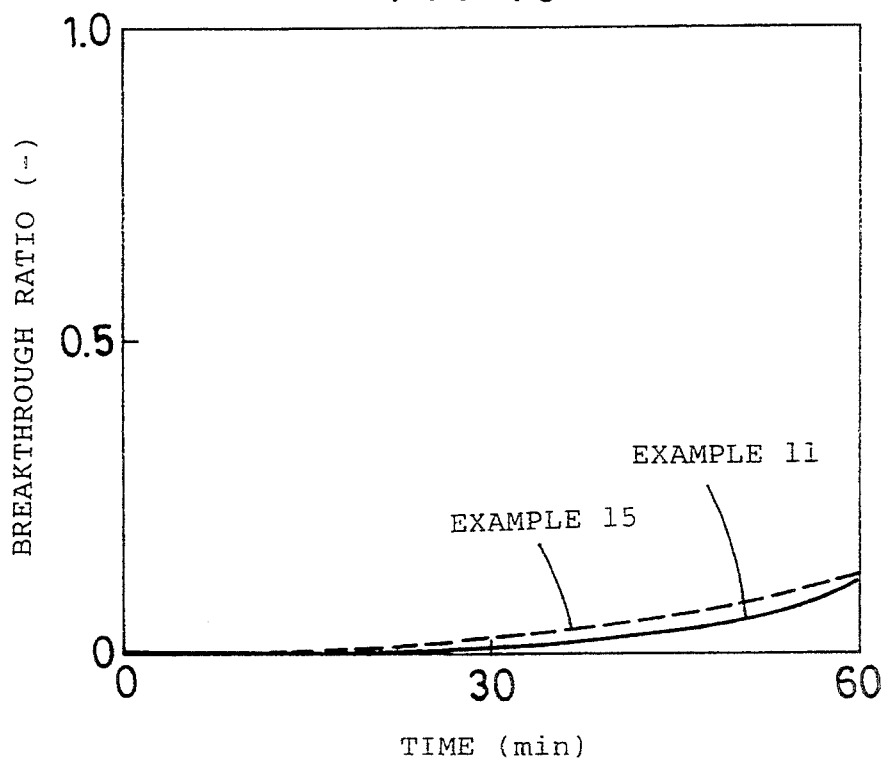
FIG. 16 is a graph showing a relation between the time and the breakthrough ratio.

FIG. 16 reveals that the adsorbent retains a high NOx adsorbing property even at an increased moisture content and is useful for efficiently removing NOx even at the moisture content of the atmosphere.

Amount of Ru Supported

Flat sheet-corrugated sheet multilayer structures were prepared by the procedure of Example 11. Each of the structures was immersed in an aqueous ruthenium chloride solution of specified concentration at room temperature for a predetermined period of time, then washed with water and thereafter dried. Honeycomb adsorbents were thus prepared which were different in the amount of Ru supported.

Figure 17:
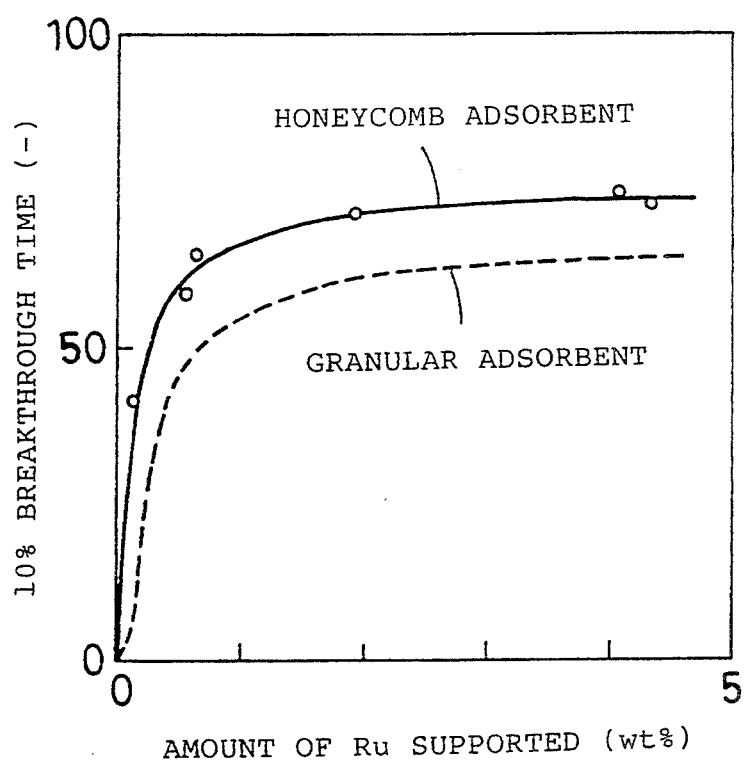
FIG. 17 is a graph showing a relation between the amount of Ru supported and the 10% breakthrough time.

These adsorbents were each fitted into a reactor tube in the same manner as in Example 11 and checked for the NOx concentration of the outlet gas under the same condition to determine 10% breakthrough time. FIG. 17 shows the relation between the amount of Ru supported and the 10% breakthrough time estabilished.

As will be apparent from the drawing, an increase in the amount of Ru supported results in an increased 10% breakthrough time, i.e., a higher NOx adsorbing property. However, when the amount of Ru exceeds about 2 wt. %, the 10% breakthrough time becomes approximately definite.

The same procedure as above was repeated except that the carriers used were granular titania carriers. FIG. 17 also shows the relation between the amount of Ru supported and the 10% breakthrough time.

A comparison between the two types of adsorbents reveals that the honeycomb adsorbents were superior to the granular adsorbents in adsorbing property.

EXAMPLE 16

By the same procedure as in Example 11, flat sheets 1 and corrugated sheets 2 were fabricated into a multilayer structure externally measuring 22 mm in diameter and 50 mm in length and having a geometric surface area of 0.0385 m² and a weight of 4.3 g (TiO₂ content: 3.3 g) as shown in FIG. 9.

The flat sheet-corrugated sheet multilayer structure was immersed in an aqueous mixture solution of ruthenium chloride (RuCl₃) and manganese chloride (MnCl₂) in an amount of 100 ml (Ru concentration: 0.38 wt. % Mn concentration: 2.07 wt. %) at room temperature for 30 minutes. The structure was then washed with water and thereafter dried at about 110° C. for 2 hours to obtain Ru-Mn co-supporting titania honeycomb adsorbent (amount of Ru supported: 0.55 wt. %, amount of Mn supported: 3.00 wt. %).

Figure 18:
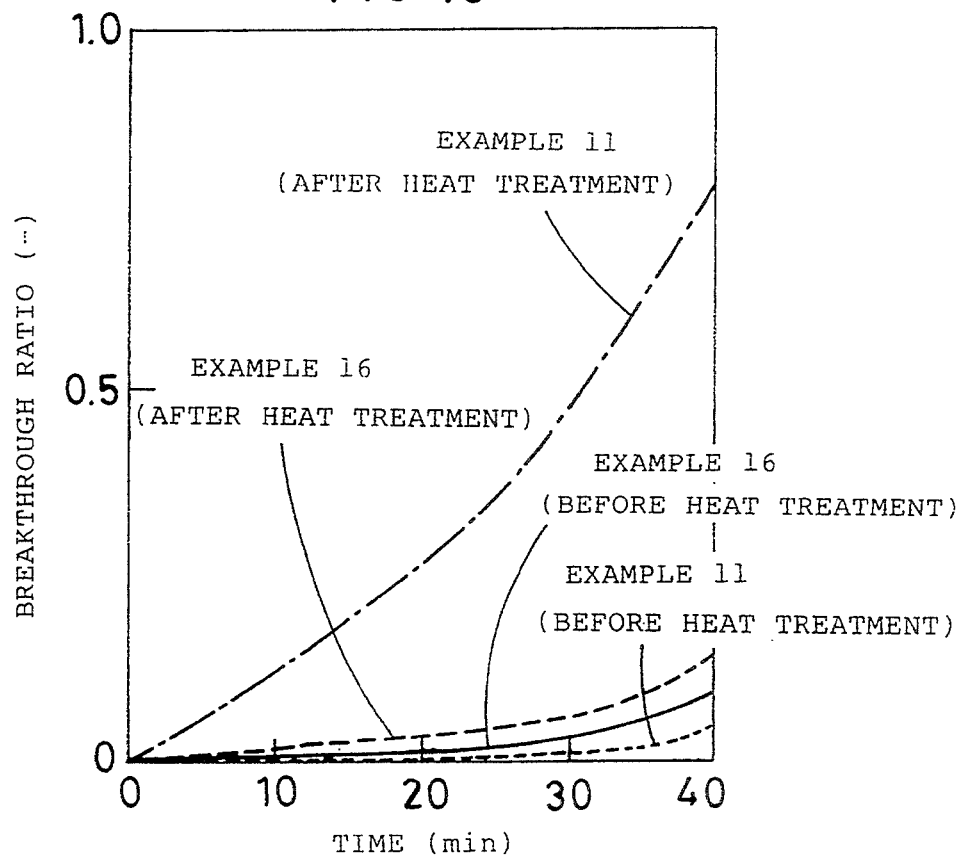
FIG. 18 is a graph showing a relation between the time and the breakthrough ratio.

The adsorbent was fitted into a stainless steel reactor tube 3 having an inside diameter of 22 mm and checked for the NOx concentration of the outlet gas of the reactor tube by the same procedure as in Example 11. FIG. 18 shows the resulting variations in the NOx concentration of the outlet gas with time in terms of breakthrough ratio, as indicated as Example 16.

In the case of Example 16 (before heat treatment) shown in the drawing, the time (breakthrough time) taken for the NOx concentration of the outlet gas to reach 5% of the inlet concentration (breakthrough ratio: 0.05), i.e., 0.175 ppm, was 33.0 minutes.

Next, the adsorbent was heat-treated in the atmosphere at 250° C. for 100 hours and thereafter checked for NOx adsorption characteristics by the same procedure and under the same condition as above. FIG. 18 shows the resulting variations in the NOx concentration of the outlet gas, as indicated as Example 16 (after heat treatment). In the case of Example 16 (after heat treatment), the breakthrough time was 27 minutes for the breakthrough ratio of 0.05.

Evaluation of the Property

The adsorbent of Example 11 was checked for NOx adsorption characteristics by the same procedure and under the same condition as in Example 16. FIG. 18 shows the resulting variations in the NOx concentration of the outlet gas, as indicated as Example 11. With Example 11 shown, the breakthrough time was 40 minutes for the breakthrough ratio of 0.05.

Next, the adsorbent of Example 11 was heat-treated under the same condition as in Example 16, and therafter checked for NOx adsorption characteristics by the same procedure and under the same condition as in Example 16. FIG. 18 shows the resulting variations in the NOx concentration of the outlet gas, as indicated as Example 11 (after heat treatment). With Example 11 (after heat treatment) shown in the drawing, the breakthrough time was 5 minutes for the breakthrough ratio of 0.05.

EXAMPLE 17

The same procedure as in Example 16 was repeated except that the immersion solution used was 100 ml of an aqueous mixture solution of ruthenium chloride (RuCl₃) and cerium chloride (CeCl₃) (Ru concentration: 0.38 wt. % Ce concentration: 5.32 wt. %) to prepare a Ru-Ce co-supporting titania adsorbent (amount of Ru supported: 0.55 wt. %, amount of Ce supported: 7.70 wt. %).

Figure 19:
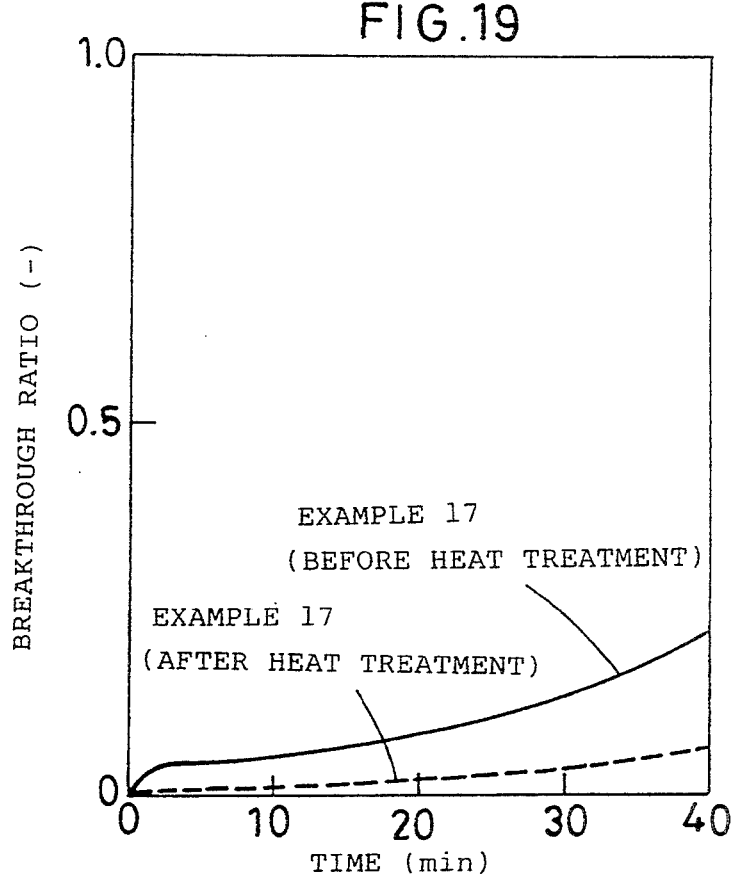
FIG. 19 is a graph showing a relation between the time and the breakthrough ratio.

The adsorbent was checked for NOx adsorption characteristics by the same procedure and under the same condition as in Example 16. FIG. 19 shows the resulting variations in the NOx concentration of the outlet gas with time, as indicated as Example 17 (before heat treatment). With Example 17 (before heat treatment), the breakthrough time was 14 minutes for the breakthrough ratio of 0.05.

Next, the adsorbent was heat-treated under the same condition as in Example 16, and thereafter checked for NOx adsorption characteristics by the same procedure and under the same condition as above. FIG. 19 shows the resulting variations in the NOx concentration of the outlet gas with time, as indicated as Example 17 (after heat treatment). In the case of Example 17 (after heat treatment) shown in the drawing, the breakthrough time was 35 minutes for the breakthrough ratio of 0.05.

EXAMPLE 18

A Ru-K co-supporting titania adsorbent (amount of Ru supported: 0.55 wt. %, amount of K supported: 0.42 wt. %) was prepared by the same procedure as in Example 16 except that the immersion solution used was 100 ml of an aqueous mixture solution of ruthenium chloride (RuCl₃) and potassium chloride (KCl) (Ru concentration: 0.38 wt. % K concentration: 0.29 wt. %)

Figure 20:
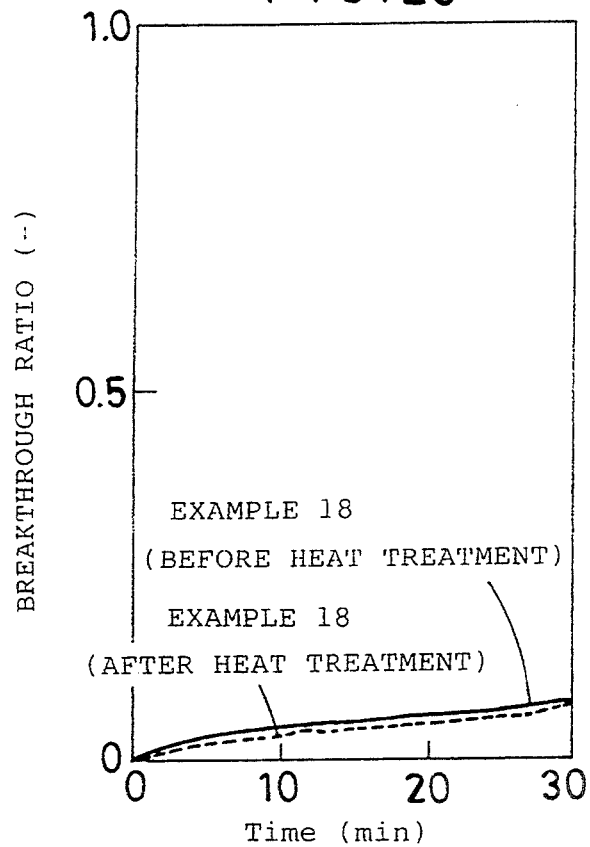
FIG. 20 is a graph showing a relation between the time and the breakthrough ratio.

The adsorbent was checked for NOx adsorption characteristics by the same procedure and under the same condition as in Example 16. FIG. 20 shows the resulting variations in the NOx concentration of the outlet gas with time, as indicated as Example 18 (before heat treatment). In the case of Example 18 (before heat treatment) shown in the drawing, the breakthrough time was 14 minutes for the breakthrough ratio of 0.05.

Next, the adsorbent was heat-treated under the same condition as in Example 16, and thereafter checked for NOx adsorption characteristics by the same procedure and under the same condition as above. FIG. 20 shows the resulting variations in the NOx concentration of the outlet gas with time, as indicated as Example 18 (after heat treatment). With Example 18 (after heat treatment) shown in the drawing, the breakthrough time was 20 minutes for the breakthrough ratio of 0.05.

EXAMPLES 19–27 AND COMPARATIVE EXAMPLES 5–7

In these examples and comparative examples, titania adsorbents each having co-supported Ru and addition metal were prepared by the same procedure as in Example 16 with the exception of using the aqueous mixture solutions listed in Table 1 below for immersion.

These adsorbents were checked for NOx adsorption characteristics by the same procedure and under the same condition as in Example 16. Table 1, the column "Breakthrough time before heat treatment" shows the periods of breakthrough time thus determined for the adsorbents at the breakthrough ratio of 0.05.

Next, these adsorbents were heat-treated under the same condition as in Example 16 and thereafter checked for NOx adsorption characteristics under the same condition as above. The breakthrough time determined for the adsorbents at the breakthrough ratio of 0.05 is given in the corresponding column of Table 1.

TABLE 1

| | Immersion soln. (of chlorides) | Amount of Ru supported (wt. %) | Amount of addition metal supported (wt. %) | Breakthrough time before heat treatment (min) | Breakthrough time after heat treatment (min) |
| --- | --- | --- | --- | --- | --- |
| Example 16 | RuCl₃ + MnCl₂ | 0.55 | 3.00 | 33 | 27 |

TABLE 1-continued

| | Immersion soln. (of chlorides) | Amount of Ru supported (wt. %) | Amount of addition metal supported (wt. %) | Breakthrough time before heat treatment (min) | Breakthrough time after heat treatment (min) |
|---|---|---|---|---|---|
| Example 17 | $RuCl_3 + CeCl_3$ | 0.55 | 7.70 | 14 | 35 |
| Example 18 | $RuCl_3 + KCl$ | 0.55 | 0.42 | 14 | 20 |
| Example 19 | $RuCl_3 + NaCl$ | 0.55 | 1.25 | 32 | 24 |
| Example 20 | $RuCl_3 + MgCl_2$ | 0.55 | 1.32 | 34 | 26 |
| Example 21 | $RuCl_3 + CaCl_2$ | 0.55 | 2.18 | 29 | 22 |
| Example 22 | $RuCl_3 + CuCl_2$ | 0.55 | 3.46 | 35 | 25 |
| Example 23 | $RuCl_3 + ZnCl_2$ | 0.55 | 3.56 | 31 | 23 |
| Example 24 | $RuCl_3 + RbCl$ | 0.55 | 4.66 | 26 | 24 |
| Example 25 | $RuCl_3 + ZrCl_4$ | 0.55 | 4.97 | 24 | 21 |
| Example 26 | $RuCl_3 + BaCl_2$ | 0.55 | 7.48 | 28 | 22 |
| Example 27 | $RuCl_3 + MoCl_5$ | 0.55 | 5.22 | 26 | 20 |
| Comp. Ex. 5 | $RuCl_3 + BiCl_3$ | 0.55 | 11.38 | 36 | 2 |
| Comp. Ex. 6 | $RuCl_3 + SnCl_2$ | 0.55 | 6.46 | 32 | 3 |
| Comp. Ex. 7 | $RuCl_3 + SbCl_5$ | 0.55 | 6.63 | 35 | 2 |

Evaluation of the Property

FIGS. 18 to 20 and Table 1 showing the NOx adsorption characteristics of the adsorbents reveal the following. The adsorbents of Examples 16 to 27 retain satisfactory activity even when exposed to a high-temperature atmosphere of 250° C. for 100 hours. This suggests that these adsorbents are continuously usable through repeated adsorption and regeneration.

In contrast, the adsorbents of Comparative Examples 5 to 7 exhibited a markedly impaired property when exposed to a high-temperature atmosphere of 250° C. for 100 hours although comparable to the adsorbents of Examples in the initial property.

Adsorbent Regeneration Temperature

Figure 21:
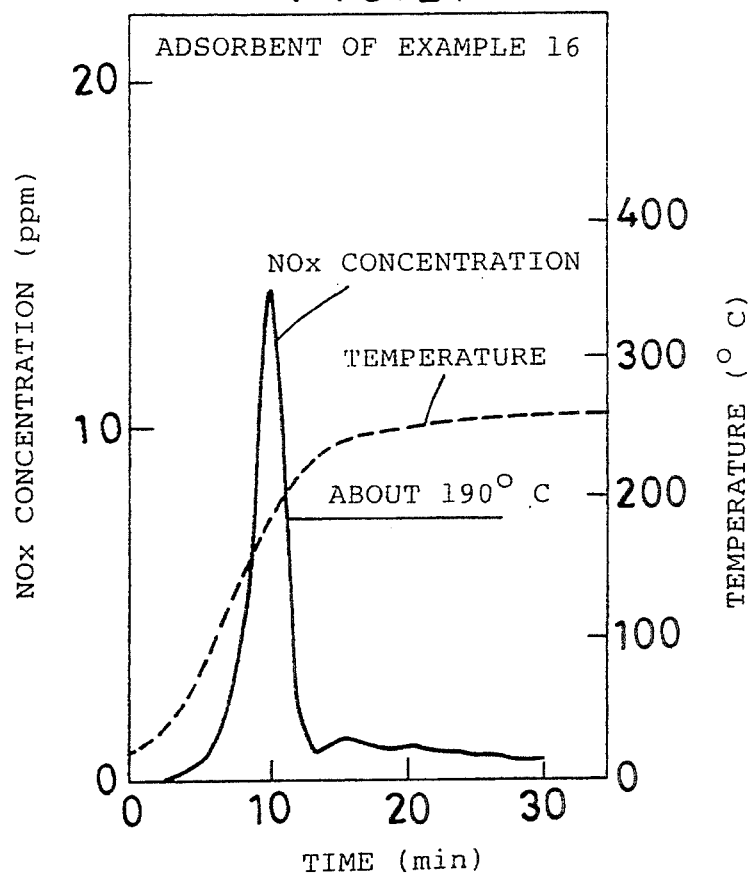
FIG. 21 is a graph showing a relation of the time with the NOx concentration and with the temperature.

After NOx was desorbed from the adsorbent of Example 16 by the procedure of Example 16, the temperature of the adsorbent was raised while passing air as adjusted to a moisture content of 500 ppm through the reactor tube at 2.5 NL/min. FIG. 21 shows the resulting variations in the NOx concentration of the outlet gas of the tube.

As will be apparent from the drawing, the amount of NOx desorbed increases as the temperature of the adsorbent rises, consequently increasing the outlet NOx concentration greatly. As the amount of NOx remaining in the adsorbent thereafter decreases owing to desorption, the amount of NOx desorbed decreases to lower the outlet NOx concentration. Accordingly, the outlet NOx concentration is represented by a curve having a desorption peak. In the case of the adsorbent of Example 16 used for the removal of NOx, the desorption peak after the removal was about 190° C.

In the case where the adsorbent of Example 11 was used for removing NOx and thereafter treated by the same desorption procedure as above, the desorption peak was about 240° C. as shown in FIG. 13.

This indicates that the adsorbent of Example 16 permits removal of adsorbed NOx at a lower temperature and is easier to regenerate.

EXAMPLE 27

Figure 22:
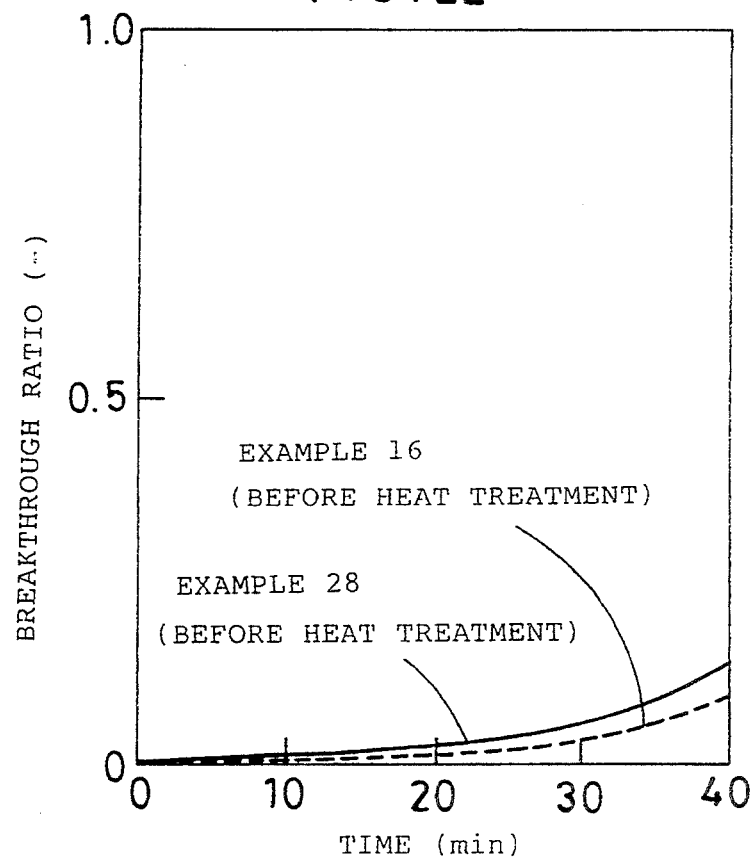
FIG. 22 is a graph showing a relation between the time and the breakthrough ratio.

A Ru-supporting titania adsorbent prepared by the same method as in Example 16 was fitted into a reactor tube as in Example 16, dried under the same condition and then allowed to cool. With the passage of dry air thereafter discontinued, air adjusted to a moisture content of about 22,000 ppm (temperature: 26.0° C., relative humidity: 51%) and containing 3.5 ppm of NOx was introduced into the adsorbent at 2.5 NL/min as a reactive gas to measure the NOx concentration in the reactor tube outlet gas. FIG. 22 shows the resulting variations in the concentration with time, as indicated as Example 27, along with the result of Example 16 (moisture content: 500 ppm).

FIG. 22 reveals that the adsorbent retains a high NOx adsorbing property even at an increased moisture content and is useful for efficiently removing NOx even at the moisture content of the atmosphere.

Amount of Ru Supported

Flat sheet-corrugated sheet multilayer structures were prepared by the same procedure as in Example 16. Each of the structures was immersed in an aqueous mixture solution containing ruthenium chloride and manganese chloride in specified concentrations (Ru concentration: 0.2 to 0.3 wt. %, Mn concentration: 2.07 wt. %) at room temperature for a predetermined period of time, then washed with water and thereafter dried. Honeycomb adsorbents were thus prepared which were different in the amount of Ru supported.

Figure 23:
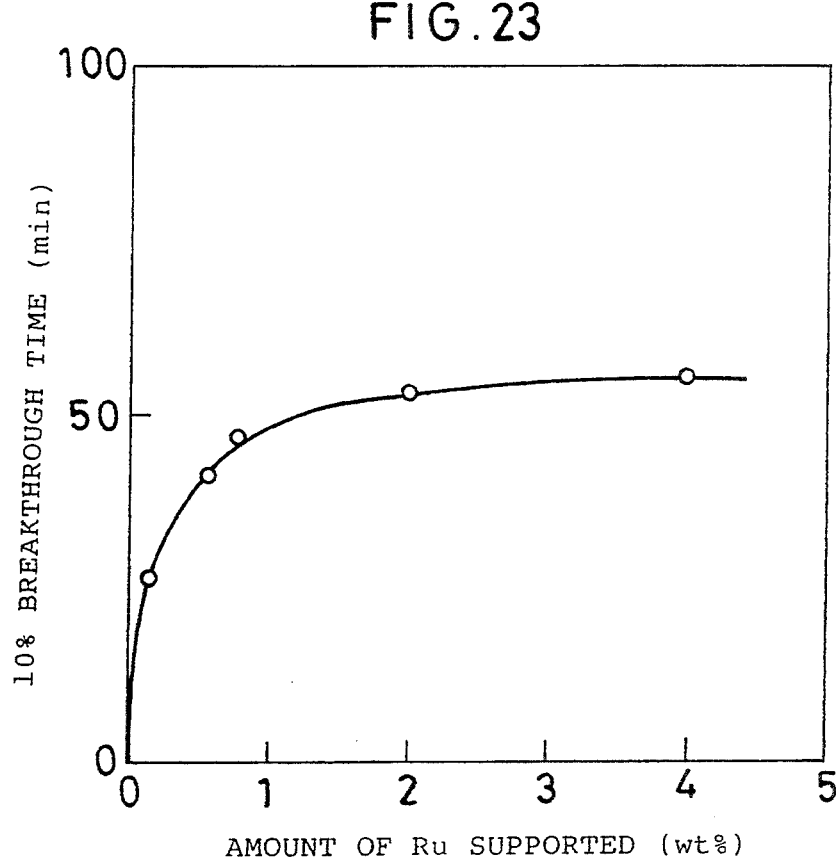
FIG. 23 is a graph showing a relation between the amount of Ru supported and the 10% breakthrough time.
Figure 24:
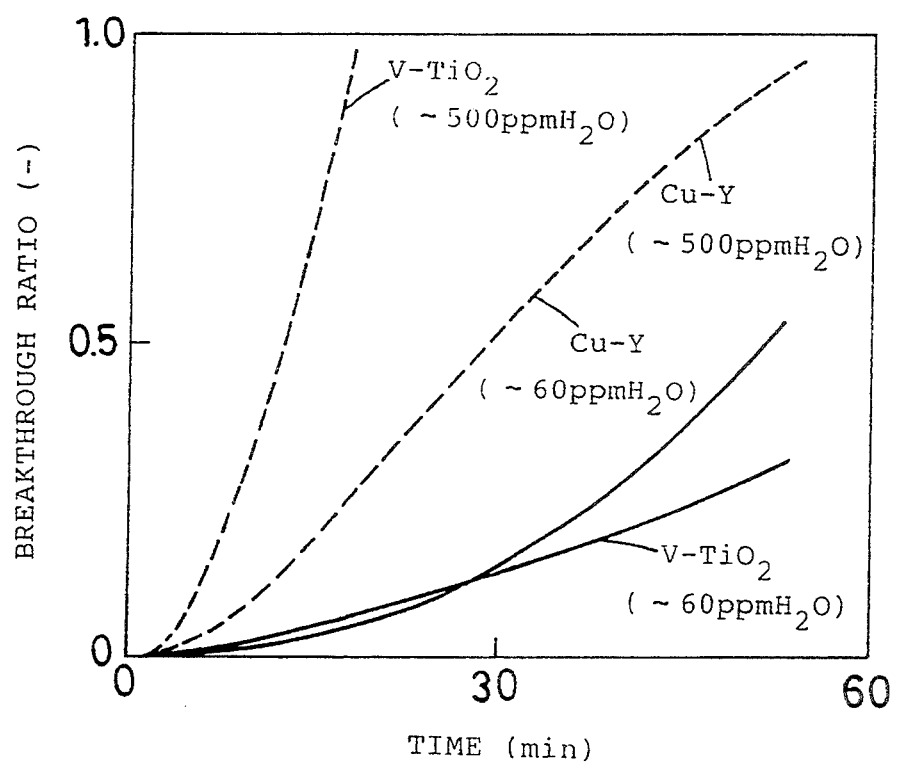
FIG. 24 is a graph showing relations between the time and the breakthrough ratio as established by conventional adsorbers.

These adsorbents were each fitted into a reactor tube in the same manner as in Example 16 and checked for the NOx concentration of the outlet gas under the same condition to determine 10% breakthrough time (the time taken for the NOx concentration of the outlet gas to reach 10% of the inlet concentration). FIG. 23 shows the relation between the amount of Ru supported and the 10% breakthrough time established.

As will be apparent from the drawing, an increase in the amount of Ru supported results in an increased 10% breakthrough time, i.e., a higher NOx adsorbing property. However, when the amount of Ru exceeds about 2 wt. %, the 10% breakthrough time becomes approximately definite.

What we claim is:

1. An adsorbent for removing low-concentration nitrogen oxides comprising a carrier comprising gamma-alumina or anatase-type titania, a ruthenium halide and at least one halide of an addition metal co-supported on the carrier, the addition metal being selected from the group consisting of copper, zinc, rubidium and cerium.

2. An absorbent as defined in claim 1 wherein the carrier contains an organic or inorganic auxiliary forming agent and an inorganic fibrous substance in addition to gamma-alumina.

3. An adsorbent as defined in claim 1 wherein the amount of ruthenium halide supported is 0.1 to 5 wt. % calculated a ruthenium metal and based on the adsorbent.

4. An adsorbent as defined in claim 1 wherein the amount of the halide of the addition metal supported is 1 to 10 wt. % calculated as the metal and based on the adsorbent.

5. An adsorbent for removing low-concentration nitrogen oxides comprising a carrier comprising a flat sheet-corrugated sheet multilayer structure having a honeycomb section, a ruthenium halide and halide of an addition metal cosupported thereon, the addition metal being selected from the group consisting of copper, zinc, rubidium and cerium, the multilayer structure being composed of alternately arranged flat sheets of ceramic paper retaining a carrier of gamma-alumina thereon and corrugated sheets of ceramic paper retaining the same carrier thereon.

6. An adsorbent for removing low-concentration nitrogen oxides comprising ceramic paper retaining thereon a carrier comprising anatase-type titania, a ruthenium halide and a halide of an addition metal co-supported on the ceramic paper, the addition metal being selected from the group consisting of copper, zinc, rubidium and cerium.

7. An adsorbent as defined in claim 6 wherein the amount of anatase-type titania retained on the ceramic paper is 25 to 500 g/m².

8. An adsorbent as defined in claim 6 wherein the amount of ruthenium halide supported is 0.1 to 5 wt. % calculated as ruthenium metal and based on the adsorbent.

9. An adsorbent as defined in claim 6 wherein the amount of the halide of the addition metal supported is 1 to 10 wt % calculated as the metal and based on the adsorbent.

10. An adsorbent for removing low-concentration nitrogen oxides comprising a flat sheet-corrugated sheet multilayer having a honeycomb section, and a ruthenium halide and a halide of at least one addition metal co-supported on the structure, the multilayer structure being composed of alternately arranged flat sheets of ceramic paper retaining a carrier of anatase-type titania thereon and corrugated sheets of ceramic paper retaining the same carrier thereon, the addition metal being selected from the group consisting of copper, zinc, rubidium and cerium.

11. An adsorbent for removing low-concentration nitrogen oxides comprising ceramic paper retaining thereon a carrier comprising anatase-type titania, and a ruthenium halide and a halide of at least one addition metal co-supported on the ceramic paper, the addition metal being selected from the group consisting of copper, zinc, rubidium and cerium.

12. An adsorbent as defined in claim 11 wherein the amount of anatase-type titania retained on the ceramic paper is 25 to 500 g/m².

13. An adsorbent as defined in claim 11 wherein the amount of ruthenium halide supported is 0.1 to 5 wt. % calculated as ruthenium metal and based on the adsorbent.

14. An adsorbent as defined in claim 11 wherein the amount of addition metal halide supported is 1 to 10 wt. % calculated as the metal and based on the adsorbent.

* * * * *